US007139018B2

(12) United States Patent
Grosvenor et al.

(10) Patent No.: US 7,139,018 B2
(45) Date of Patent: Nov. 21, 2006

(54) SYNCHRONIZED CAMERAS WITH AUTO-EXCHANGE

(75) Inventors: David Arthur Grosvenor, Bristol (GB); Stephen Philip Cheatle, Bristol (GB)

(73) Assignee: Hewlett-Packard Development Company L.P., Houston, TX (US)

( * ) Notice: Subject to any disclaimer, the term of this patent is extended or adjusted under 35 U.S.C. 154(b) by 721 days.

(21) Appl. No.: 10/191,535

(22) Filed: Jul. 10, 2002

(65) Prior Publication Data

US 2003/0021591 A1 Jan. 30, 2003

(30) Foreign Application Priority Data

Jul. 27, 2001 (GB) ................................. 0118436.5

(51) Int. Cl.
*H04N 5/232* (2006.01)
*H04N 5/76* (2006.01)
(52) U.S. Cl. ................................. 348/211.3; 348/231.3
(58) Field of Classification Search .. 348/211.1–211.3, 348/231.2, 231.3
See application file for complete search history.

(56) References Cited

U.S. PATENT DOCUMENTS

| 5,499,294 | A | * | 3/1996 | Friedman ..................... 713/179 |
| 6,141,611 | A | | 10/2000 | Mackey et al. |
| 6,167,469 | A | | 12/2000 | Safai et al. |
| 6,285,995 | B1 | * | 9/2001 | Abdel-Mottaleb et al. ...... 707/3 |
| 6,741,271 | B1 | * | 5/2004 | McConica et al. ........... 715/839 |

FOREIGN PATENT DOCUMENTS

EP 1 061 758 12/2000
WO 99/24907 5/1999

OTHER PUBLICATIONS

The IEEE Standard Dictionary of Electrical and Electronics Terms; Sixth Edition; 1997; p. 251.*

* cited by examiner

*Primary Examiner*—Vivek Srivastava
*Assistant Examiner*—Timothy J. Henn
(74) *Attorney, Agent, or Firm*—Foley & Lardner LLP (57) ABSTRACT

A method of sharing a digital recording between a group of users of digital recording devices (e.g. digital cameras) present at a common event, the method including: (a) creating a digital recording (e.g. a digital photograph) using a digital recording device; (b) subjecting the users' digital recording devices to a synchronization event associated with the common event, the synchronization event resulting in the transmission of a synchronization code between the users' digital recording devices, the synchronization code including an address code to uniquely identify a database; (c) establishing a digital communication connection between the digital recording device which created the recording and the database; (d) causing the database to receive the digital recording without input from a user; and (e) enabling a user to access the digital recording from the database. The invention also provides a digital recording device for creating digital recordings, the digital recording device being communicatively connectable to a data communication network, the the digital recording device being operable to receive a synchronization code and hence to become synchronized with other such digital recording devices, the synchronization code including the address of a database, the digital recording device being configured to make digital recordings available to the database at the address without input from a user on the establishment of a data communication connection between the digital recording device and the data communication network.

26 Claims, 6 Drawing Sheets

SYNCHRONIZED CAMERAS WITH AUTO-EXCHANGE

The present invention relates to a means of sharing digital recordings, for example, digital photographs, between multiple users.

BACKGROUND OF THE INVENTION

People take photographs for many different purposes. Many people enjoy taking photographs as a hobby or a pastime, commonly to keep a permanent record of places visited on holiday or days out, or in order to keep a memento of family celebrations such as birthday parties or festive occasions. Others, such as photo-journalists, take photographs during the course of their professional work.

Often a given event is attended by a number of individuals, each of whom has his own camera and takes his own photographs of the event in question. The individuals' photographs will often show the common event from different perspectives and viewpoints, and the photographs taken will inevitably be influenced by the individuals' own judgement and perception of the event.

At parties and other gatherings, friends often take photographs of each other. Additionally, it is often desirable, but often not possible, for an individual to take pictures of himself. Even if his camera has a built-in self-take timer-based mechanism, this can be difficult to operate, and requires the camera to be positioned carefully and then the individual to stand in the correct place in front of the lens before the camera's timer causes the picture to be taken. An alternative approach is for the individual in question to give his camera to another person to take his photograph. However, this involves entrusting the other person, who may be a stranger, with a potentially expensive piece of equipment. It is not unheard of for camera thieves to operate in this way, offering to take a photograph of the camera owner and then fleeing with the camera when it is handed over.

If the volunteer is known to the camera owner and is not a camera thief, there is nevertheless often another problem to be surmounted before the photograph of the camera owner can be taken: The volunteer must rapidly familiarise himself with the controls of what may well be an unfamiliar camera. Modern cameras can have complex controls which would need to be adjusted in order to take the optimum picture, and explaining these features to the volunteer may take an undesirably long period of time. In photography it is important to be able to "capture the moment": The camera owner may well wish to have his picture taken alongside a transient object such as a passing vintage car or steam train, a well-known film-star or other celebrity, or a rare fleeting animal or bird. Having to explain the mode of operation of an unfamiliar camera to someone in order for this picture to be taken may result in this opportunity having been missed, possibly for all time.

Part of the enjoyment to be derived from amateur photography is the showing, sharing and swapping, among friends and family, of photographs one has taken. It is often the case that an individual takes a number of photographs of which others would like copies. With respect to events attended by multiple photographers, it is common for attendees to wish to have copies of the pictures of the event that the others have taken, so as to be able to benefit from the individuals' respective vantage points and, often, good fortune in being able to capture an event that the others missed or did not photograph as successfully.

With cameras that utilise photographic film, the procedure for swapping such photographs is potentially extremely awkward and time consuming. The individuals in question have no definite way of knowing the appearance and composition of the pictures until the film is finished and the photographs have been developed and printed. Multiple copies of the film (or possibly of individual pictures if the printer allows) can be printed straightaway, but without knowing the appearance of the pictures beforehand this may result in the unnecessary printing of multiple copies of ultimately unwanted photographs. Alternatively, one set of prints may be obtained and then selected reprints can be commissioned, but this protracts yet further the overall timeframe for supplying the copies of the pictures to the people who required them. Printing of multiple copies of prints can also become expensive if numerous reprints are required. A further disadvantage is that reprints would often need to be posted (thereby incurring additional cost) to the intended recipients, whose addresses would first need to be known.

With digital cameras the procedure for swapping photographs is partially facilitated, since most digital cameras allow the user to preview pictures using a built-in display, and thereby decide which pictures to swap with the other photographers. However, in a group event such as a party or a concert, the various individuals would need to look at the pictures held in a number of different cameras to decide which pictures to exchange. A possible existing way of achieving this would be to pass the digital cameras around the members of the group, for each person to make a note of the pictures taken by others that he would like copied, and then for the users to go their separate ways and either to print the pictures and send them physically (e.g. by post) to the intended recipients, or to send the digital image file by electronic means such as e-mail using a computer. In the latter case there is not currently a standard exchange protocol for camera to camera image communication, so each member of the group would have to transfer their own images to a personal computer (PC) and then e-mail the pictures to everyone in the group. This would require obtaining the e-mail addresses of the intended recipients beforehand.

U.S. Pat. No. 6,167,469 teaches a digital camera adapted to send specific images, on explicit instruction by the user, to nominated recipients via the Internet. The uploading of pictures to a dedicated website, for viewing by others, is also taught. It will be appreciated that the use of such a system in which photographs have to be specifically uploaded may be time-consuming to use, and that this does not readily enable the sharing of pictures taken by individuals attending a common event.

Whatever existing alternative is chosen, it will be apparent that ensuring that the members of a group of photographers who attend a common event have access to each other's photographs requires considerable co-ordination between the members of the group. It is potentially costly in time, effort and expense, and each member of the group is obliged to remember to take the requisite personal action for the benefit of the others.

It is a general object of the present invention to overcome or at least mitigate the problems identified above.

SUMMARY OF THE INVENTION

According to a first aspect of the invention there is provided a method of sharing a digital recording between a group of users of digital recording devices present at a common event, said method comprising: (a) creating a digital recording using a digital recording device; (b) subjecting the users' digital recording devices to a synchronisation event associated with the common event, the synchronisation event resulting in the transmission of a synchronisation code between the users' digital recording devices, the synchronisation code comprising an address code to uniquely identify a database; (c) establishing a digital communication connection between the digital recording device which created the recording and the database; (d) causing the database to receive the digital recording without input from a user; and (e) enabling a user to access the digital recording from the database.

The term 'digital recording' used herein refers to a digital image (e.g. a digital photograph) or digital video or digital audio, or a combination of these, or a form of digital recording hitherto unknown. An example of such a combination is an audio-photograph (i.e. an image with accompanying audio, which may be either ambient sound recorded with the photograph or sound added afterwards). Likewise, the term 'digital recording device' used herein refers to a digital camera or a digital video camera or a digital audio recorder, or a combination of these, or a digital recorder not yet devised. Hereinafter the invention will be discussed in relation to digital photographs having been taken by a digital camera, although it must be stressed that the invention is equally applicable to the sharing of other forms of digital recordings, examples of which are given above.

Accordingly this invention provides the advantage that digital photographs taken by others can be easily shared with a minimum of human involvement. Once a photograph has been taken that is intended for sharing with others then, on establishing a suitable data communication connection, the photograph is automatically made available to the database without the user needing to take any explicit action with respect to that photograph.

By subjecting the recording devices to the synchronisation event provides the advantage that each digital camera used by the members of the group will make its digital photographs available to the same database, irrespective of who took the individual pictures, enabling the participating photographers to access the photographs they collectively took at their common event. Since each digital camera is consequently provided with sufficient information to enable it to make available to the appropriate database those pictures intended for sharing, this provides the further advantage that the camera does not need to be pre-programmed or hard-coded with details of the address of the database.

In relation to digital photography, the word 'access' used in part (e) above means to have the ability to view the digital photographs via display means connected to the database, and potentially also to be able to export the photographs as digital image files to another storage medium such as the hard disk of a PC, and/or to print the photographs using a printer. Techniques and equipment for the storage, export and printing of digital image files are very well known. (It will be appreciated that if the digital recordings comprise video and/or audio then the term 'access' will also refer to playing the video and/or audio.)

The database may be hosted on a webserver, thereby providing a web-based facility that users of Internet-connected PCs can access world-wide. The Internet provides a good infrastructure for the collecting and sharing of photographs.

Preferably the synchronisation event comprises a first digital recording device transmitting a synchronisation signal in which the synchronisation code is transmitted to the other digital recording devices. This has the advantage of enabling one user to initiate the synchronisation event on behalf of all the members of his group, as and when desired.

In one preferred embodiment the synchronisation signal is transmitted using an electrical link. This has the advantage of being straightforward to do. In an alternative embodiment the synchronisation signal may be transmitted using a wireless link. This may use infra-red or radio frequency transmission. A preferred radio frequency data transmission protocol is known as Bluetooth (RTM).

In yet a further alternative embodiment of the invention, the synchronisation event comprises the users manually entering a code via the user interfaces of their digital recording devices. The user interface could comprise buttons incorporated into a camera, and this has the advantage that no data transmission between cameras would be necessary, and also potentially reduces the cost of the equipment by doing away with automated means of transmitting and receiving the synchronisation signal.

Preferably the synchronisation code further comprises an event identification code, this event identification code being attributable to the digital recordings created by the digital recording devices at the common event, to signify that the digital recordings have been created at the common event. This advantageously enables the digital recordings to be classified by the database according to the common event at which they were created.

Preferably the synchronisation code further comprises a password, the password being for use by the database to restrict access to the digital recordings created at the common event.

Preferably the synchronisation code further comprises a code identifying the initiator of the synchronisation event.

Preferably the synchronisation code further comprises a code specifying the current time. This advantageously enables the digital recording devices to synchronise their internal clocks.

Preferably the synchronisation code further comprises an encryption code for use in encrypting and/or decrypting the digital recordings during transfer to and/or from the database. This advantageously enables the recordings to be transmitted securely to and from the database.

Preferably the method further comprises a digital camera assigning a digital recording with a reference code. These reference codes enable a digital photograph, for example, to be referred to by its associated code, to facilitate image management functions within the database, and export of pictures elsewhere.

Preferably the reference code comprises information representative of the time at which the digital recording it accompanies was created, the database being able to interpret this information to organise chronologically the digital recordings taken at the common event. This enables photographs assimilated in the database to be presented in a logical chronological sequence, irrespective of who took the individual pictures.

Preferably the reference code comprises an identification code specific to the digital recording device on which it was created, the database being able to interpret this code to indicate the identity of the creator of each of the digital recordings taken at the common event. This has the advantage of informing users which of them took each picture, and also enables cataloguing by photographer of the pictures taken at the common event. The reference code may also comprise the event identification code.

Preferably the database comprises the collective data storage media of at least one digital recording device, the said at least one digital recording device having respective communication devices to enable them to function collectively as the database on establishing a digital communication connection between them. This option provides the advantage that no centralised database needs to be provided on the Internet, as the digital recording devices themselves collectively host the service and store the data.

Preferably the communication devices are selected from a group comprising: modems and GSM transceivers and GPRS transceivers. These enable the digital recording devices to communicate directly with telecommunications networks. The acronyms GSM and GPRS respectively stand for Global System for Mobile Communication and General Packet Radio Services, both of which are known and understood by those skilled in the art of mobile telecommunications.

Alternatively the database comprises the data storage media of at least one personal computer connected to a data communication network. Each user can upload his photographs (for example) from his digital camera to his personal computer, and the personal computers collectively provide the database and the photograph sharing service.

Alternatively the database comprises the data storage media of at least one data storage appliance connected to a data communication network. Such appliances include tape devices, magneto-optic, CD-ROM, or flash memory devices, and others which have yet to be invented.

Preferably the method further comprising providing a user with an opportunity to veto the inclusion in the said database of a digital recording he created. This enables a photographer to prevent others from seeing photographs of a personal or embarrassing nature, or photographs that he simply does not want others to see, for whatever reason.

Particularly preferably the digital recording devices are digital cameras and the digital recordings are digital photographs.

According to a second aspect of the invention there is provided a digital recording device for creating digital recordings, the digital recording device being communicatively connectable to a data communication network, the said digital recording device being operable to receive a synchronisation code and hence to become synchronised with other such digital recording devices, the synchronisation code comprising the address of a database, the digital recording device being configured to make digital recordings available to the database at the said address without input from a user on the establishment of a data communication connection between the digital recording device and the data communication network.

The digital recording device may be configured to prompt a user to establish a data communication connection to the said digital recording device. This ensures that it is enabled to fulfil its obligation to make its recordings (e.g. photographs) available for sharing via the database repository. The digital recording device may comprise a modem or a GSM transceiver or a GPRS transceiver to enable it to be connected to the data communication network.

Preferably the digital recording device further comprises means for transmitting and receiving signals to and from other such digital recording devices.

Preferably the means for transmitting and receiving signals comprise a port into which a cable can be inserted and electrically coupled. Alternatively and advantageously the means for transmitting and receiving signals comprise a wireless transmitter and receiver. In the latter case, particularly preferably the wireless transmitter and receiver operate using infra-red signals, or alternatively using radio frequency signals.

Preferably the digital recording device is operable to generate and receive coded information by which an event can be identified.

In one embodiment of the invention, the digital recording device has data storage media which can serve as part of the said database on connection of the digital recording device to a data communication network.

Particularly preferably the digital recording device is a digital camera.

According to a third aspect of the invention there is provided a database configured to receive digital recordings from a digital recording device via a data communication network and to enable the digital recordings to be accessed by others, the database being configured to receive the digital recordings from the digital recording device upon connection of the digital recording device to the data communication network and without input from a user. The database may be adapted to organise digital recordings stored therein in terms of any one or more parameters selected from a group comprising: the event at which the digital recording was created, the time at which the digital recording was created, the identity of the creator of the digital recording. Users may be required to supply a password in order to access a digital recording created at an event.

BRIEF DESCRIPTION OF THE DRAWINGS

Embodiments of the invention will now be described, by way of example, and with reference to the drawings in which.

DETAILED DESCRIPTION OF THE PREFERRED EMBODIMENTS

A first user, equipped with a digital camera compatible with the method of the present invention, attends an event at which other users of compatible cameras are present. This event could be a party or other such group activity, or could be a larger event such as a rock concert or a football match. The present invention also lends itself well to the sharing of photographs taken by professional photographers in attendance at a common event, such as a state occasion or a war. It is also suggested that tourist attractions, in particular theme parks, could lend or hire out compatible cameras to their visitors, who would then be able to share their common photographs using the method of the present invention. In this latter case, the theme park staff could lend the cameras to the visitors on entrance to the park, with each camera pre-synchronised for the members of a group of visitors (e.g. a family or school party). The cameras are then used to take the photographs, and afterwards are handed back to the staff. The staff then make the photographs available for sharing by the members of the group (as will be described in detail below) by downloading the pictures to a web-based repository database (possibly accessible via the theme park's own website) which can then be accessed by the visitors when they are back at home or at school. In the context of a theme park, fixed cameras provided at suitable locations throughout the park could also be provided to take pictures of visitors, and the pictures would again be made available for sharing via a repository database (often referred to herein as simply a 'repository').

Figure 1:
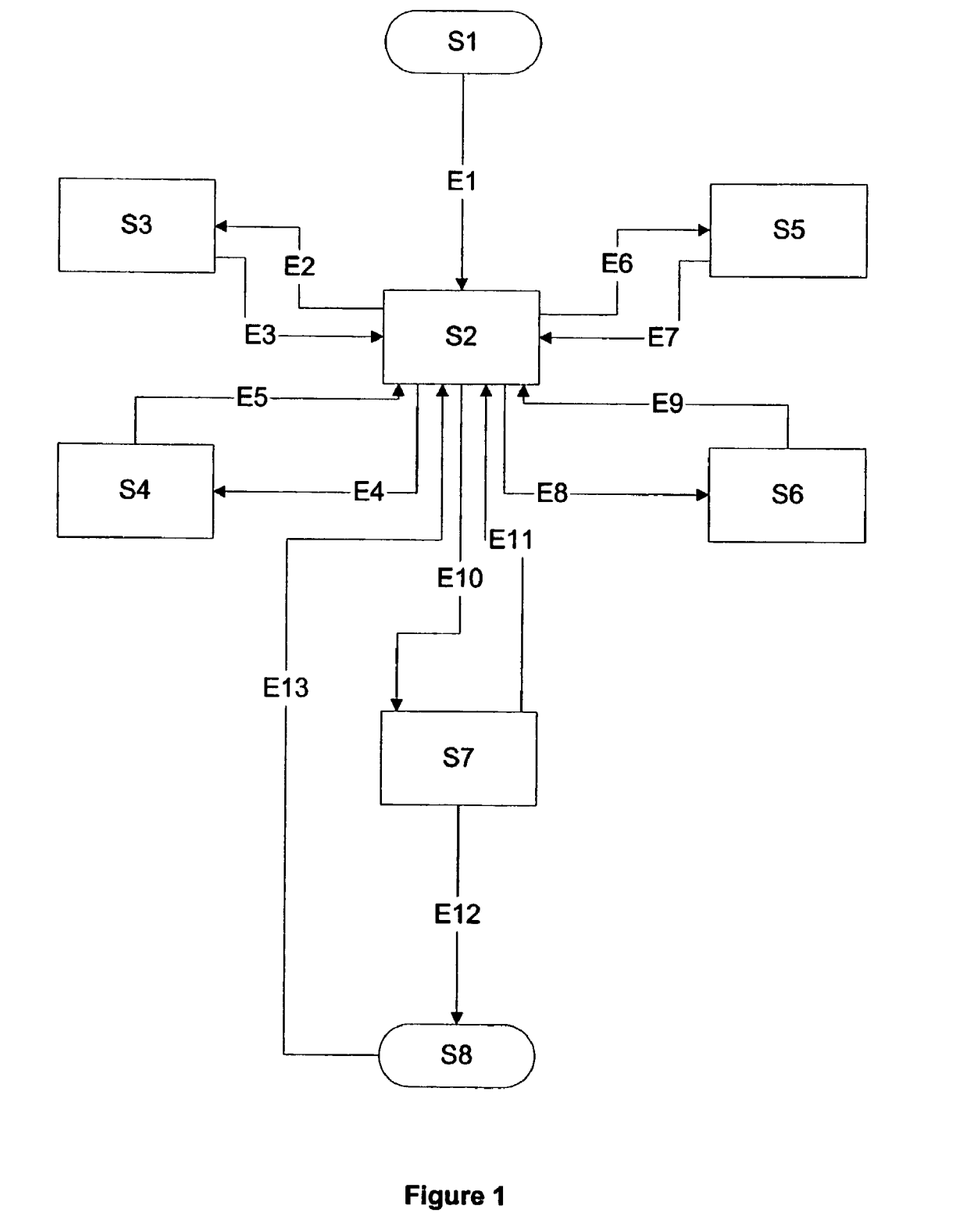
FIG. 1 illustrates the states of operation, and the transitions between states, of a digital camera used in a system for sharing photographs in accordance with the present invention.

With reference to FIG. 1, the first user's camera is initially in an unsynchronised state (S1). The camera is prepared to accept input to cause it to undergo a synchronisation event, which would result in the camera being synchronised with other compatible cameras present at the event, and ultimately the users' collective photographs being made available for sharing via the repository provided in accordance with the present invention. In a preferred embodiment of the invention this synchronisation event would be initiated by this first camera itself, although it may alternatively be generated by a third party such as the management of the football stadium or theme park at which the common event is taking place. Remote third party initiation of the synchronisation event is preferred if the individual photographers are unlikely or unable to meet up in person, for example, at a large football match or a concert.

In the preferred embodiment of the invention the first camera user takes action (E1) himself to create an event identification code (an 'Event ID'), in readiness for subsequently synchronising his camera with other cameras in a synchronisation event. The Event ID may be created with the prior knowledge of the users of the compatible cameras with whom the first user intends to synchronise his camera and ultimately to share his photographs, or may be initiated with a view to the others subsequently synchronising their cameras with his.

The first user takes photographs using his digital camera in the main picture collection state (S2) associated with the Event ID that has been created. On taking each picture, the camera briefly enters (E2) a picture approval state (S3), in which the user is given the option of vetoing the sharing of the photograph he has just taken. That is to say, the user is given the opportunity to instruct the camera that the picture that has just been taken is for his private use and is not to be made available for sharing. This intuitive system simply entails the user pressing a button to signify "Don't share that last photograph". The user may also be given the options of deleting the photograph from the picture storage media of his digital camera, and of reviewing all the pictures in the camera (or on a PC) prior to their being made available for sharing. The default situation is that all photographs taken by the user when his camera is synchronised at the common event will be automatically made available for sharing by the other users for whom their cameras are synchronised. Consequently, on exiting (E3) the picture approval state (S3) the photograph is normally designated that it should be made available for sharing via the repository.

At the common event, a second user can elect to join the first user (and others if applicable). This stage involves the cameras undergoing a synchronisation event, entering (E6) a synchronisation state (S5). The synchronisation event comprises the second user's camera receiving a synchronisation signal from the first user's camera (or another camera that has already been synchronised).

As mentioned above and as shown in FIG. 2, in the preferred embodiment of the invention the synchronisation event comprises the first user's camera 20 generating a synchronisation signal that is transmitted to the cameras 22 of the other users present at the event who intend to share their pictures. The signal includes a synchronisation code, which contains an address code (e.g. a web address) pertaining to the identity and/or location of the repository database, so that each of the synchronised cameras has knowledge of where the pictures are to be sent for sharing, and also the Event ID by which the photographs can be classified in the database repository.

Figure 2:
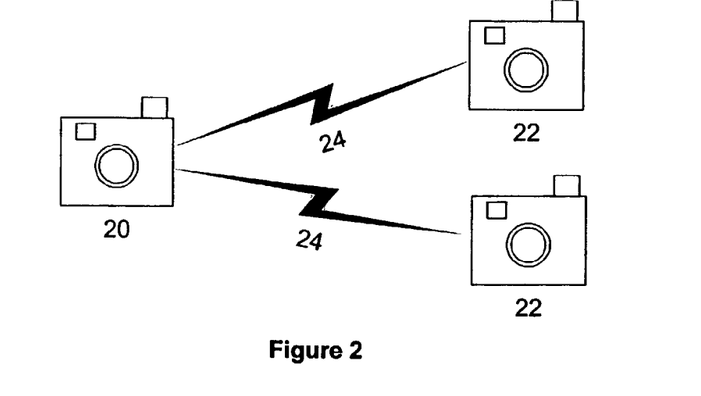
FIG. 2 illustrates the synchronisation of three cameras via wireless means.

The synchronisation code may also include a password, which can be used by the database in conjunction with the Event ID to enable users of the synchronised cameras to access their collective photographs held in the repository. The password can be used to restrict access to the group's pictures, such that only the members of the group of synchronised camera users are able to access their collective pictures.

The synchronisation code may also include a code specific to the camera which generated the synchronisation signal, thereby identifying the instigator of the event, who may act as the manager of the collective photographs within the repository.

Figure 3:
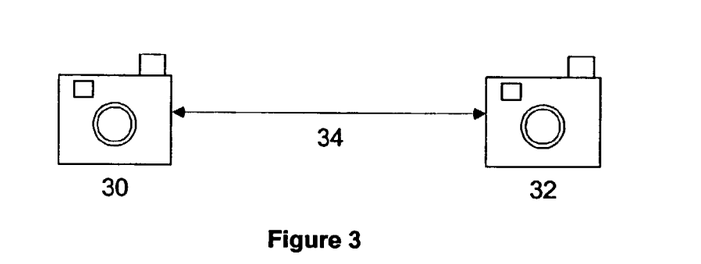
FIG. 3 illustrates the synchronisation of two cameras via an electrical connection.
Figure 4:
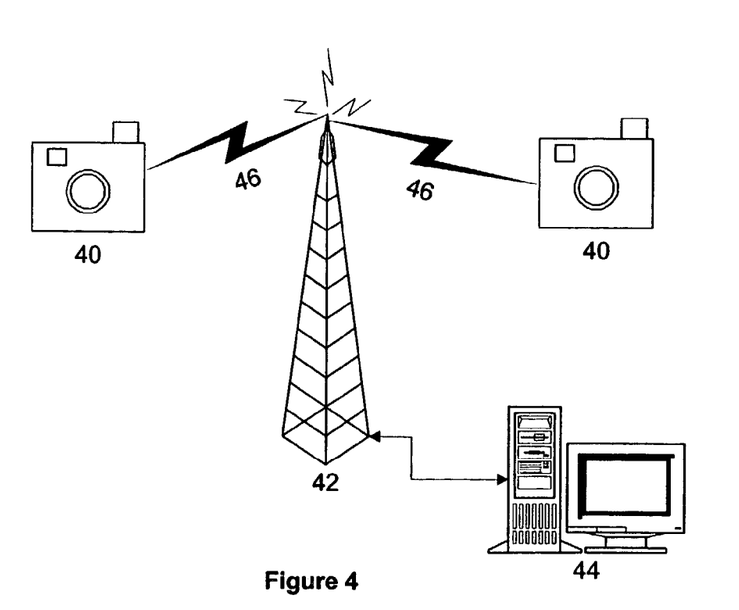
FIG. 4 illustrates the synchronisation of two cameras by a third party using wireless means.

The synchronisation signal is preferably transmitted between cameras by wireless link 24, using infra-red or radio frequency (e.g. Bluetooth (RTM)) transmission. Alternatively, as shown in FIG. 3, an electrical connection 34 could be established between the cameras 30 to be synchronised. A further alternative, which does not require direct interaction between cameras, involves the users manually entering synchronisation codes using a suitable user interface (e.g. buttons or a touch panel) provided on each of the cameras. These codes are broadly analogous to the 'VideoPlus' (RTM) codes which can be interpreted by some video cassette recorders. Whilst using manually entered codes is potentially slower than using an automated synchronisation signal, it enables the synchronisation of cameras that are mutually remote, such as could well be the case with photo-journalists covering a war zone, for example. In events held at venues such as football stadiums, or for theme parks in which the cameras are lent or hired out to users, it is envisaged (FIG. 4) that a transmitter 42 of synchronisation signals 46 (controlled by the site management using a computer 44) could be placed at the entrance of the venue, e.g. by the turnstiles, such that the users' cameras 40 will be synchronised as they pass. Alternatively transmitters could be positioned around the site so that the synchronisation signals will reach the intended users.

Synchronisation between an individual's camera and, for example, a fixed camera mounted in a theme park, is also possible.

Whilst undergoing synchronisation (S5), as part of the synchronisation code the first camera preferably also sends the current time to the second camera. Synchronisation of the time is desirable since the internal clocks of the two cameras are unlikely to be exactly in synchronism, and it is advantageous for the pictures to be tagged with accurate date and time information so that they can be organised in chronological order in the repository.

On completing synchronisation, that is, when the second camera has received the synchronisation code, both cameras revert (E7) to the picture-taking state (S2). In having transmitted and received the synchronisation code the users have elected to adopt a common Event ID, and the repository accordingly treats the pictures taken by all the synchronised cameras as originating from the common event.

Hitherto unsynchronised cameras can become synchronised with any of the cameras that have already synchronised above. To achieve this the unsynchronised cameras enter (E8) a synchronisation state (S6) with any camera which has already been synchronised. The synchronisation code, and accordingly the repository address code, Event ID and time, are thereby passed to the new cameras, which is thus now synchronised. All the synchronised cameras now revert (E9) to the picture-taking state (S2).

As alluded to above in the context of tagging a photograph with the time at which it was taken, it is advantageous for the digital camera to assign a reference code to each of the photographs that has been taken. This code is transmitted with the photograph to the repository. In the preferred embodiment of the invention, the time of taking a photograph is included in its picture reference code. Camera-specific information to enable the identification of the camera (and hence the photographer) that took each photograph is also advantageously included. This information is then utilised by the repository to catalogue the pictures taken at the common event, and also to allow users, on accessing the repository, to view the pictures taken in chronological sequence irrespective of the photographer, or in terms of the identity of the photographer, or in a sequence dependent on both these parameters.

On completing the taking of photographs at the common event, any or all the synchronised cameras may be unsynchronised (E10) from the event. Pictures now taken will not be made available to the repository as part of the collective pictures specific to that event. The camera is now in an unsynchronised state (S7) and is awaiting the next possible opportunity to download the pictures to the repository that are intended to be shared. Although the camera is now unsynchronised, the user is able to re-synchronise (E11) his camera to the event. This provision is useful in case the user mistakenly causes his camera to become unsynchronised from the event, or if he simply changes his mind.

The photographs remaining in the camera that the camera is obliged to make available for sharing are downloaded (E12) to the repository at the earliest opportunity, and are marked as having been downloaded to avoid any unnecessary repetition of data transfer. On doing so, the camera now becomes in a state (S8) in which its obligation to transfer its pictures to the repository has been fulfilled. However, whilst the Event ID is still available it is possible to rejoin (E13) the event and return to the picture-taking state (S2) in order to take more photographs to be added to the repository.

In an alternative embodiment of the invention it is possible to synchronise cameras after the event has ended. This is particularly of relevance in instances where the photographers do not meet at the event, and is particularly well suited to those users who would transfer their photographs to a personal computer prior to their being made available to the repository. By interacting with the repository via the web, using the personal computer, the user can identify the catalogue of pictures relating to the event in question and elect to have his pictures downloaded into this particular collection.

The Repository Database

Figure 5:
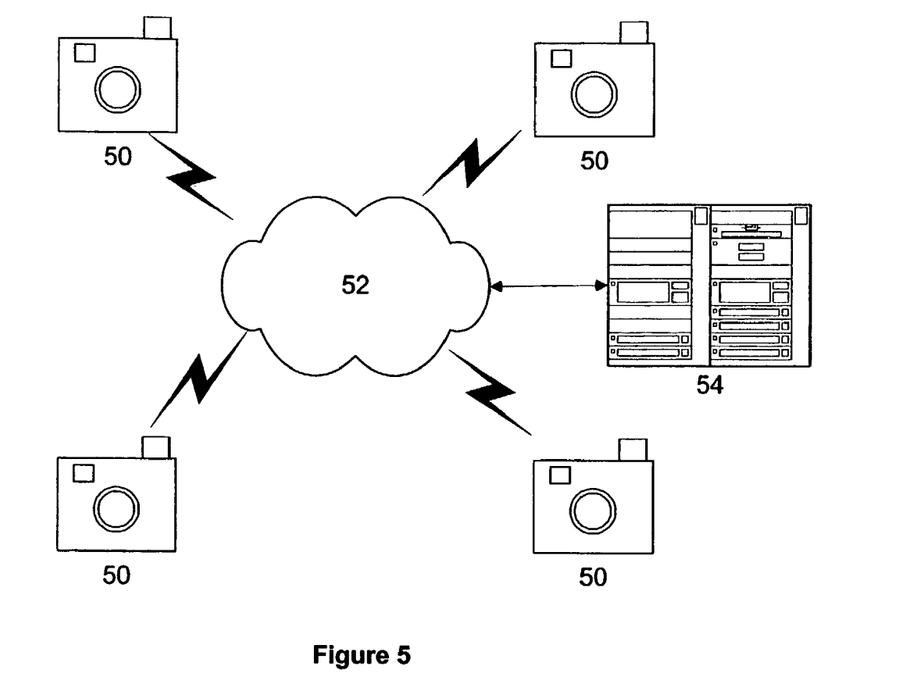
FIG. 5 illustrates the connection of cameras to a data communication network to which is also connected a remote webserver acting as a digital photograph repository.
Figure 7:
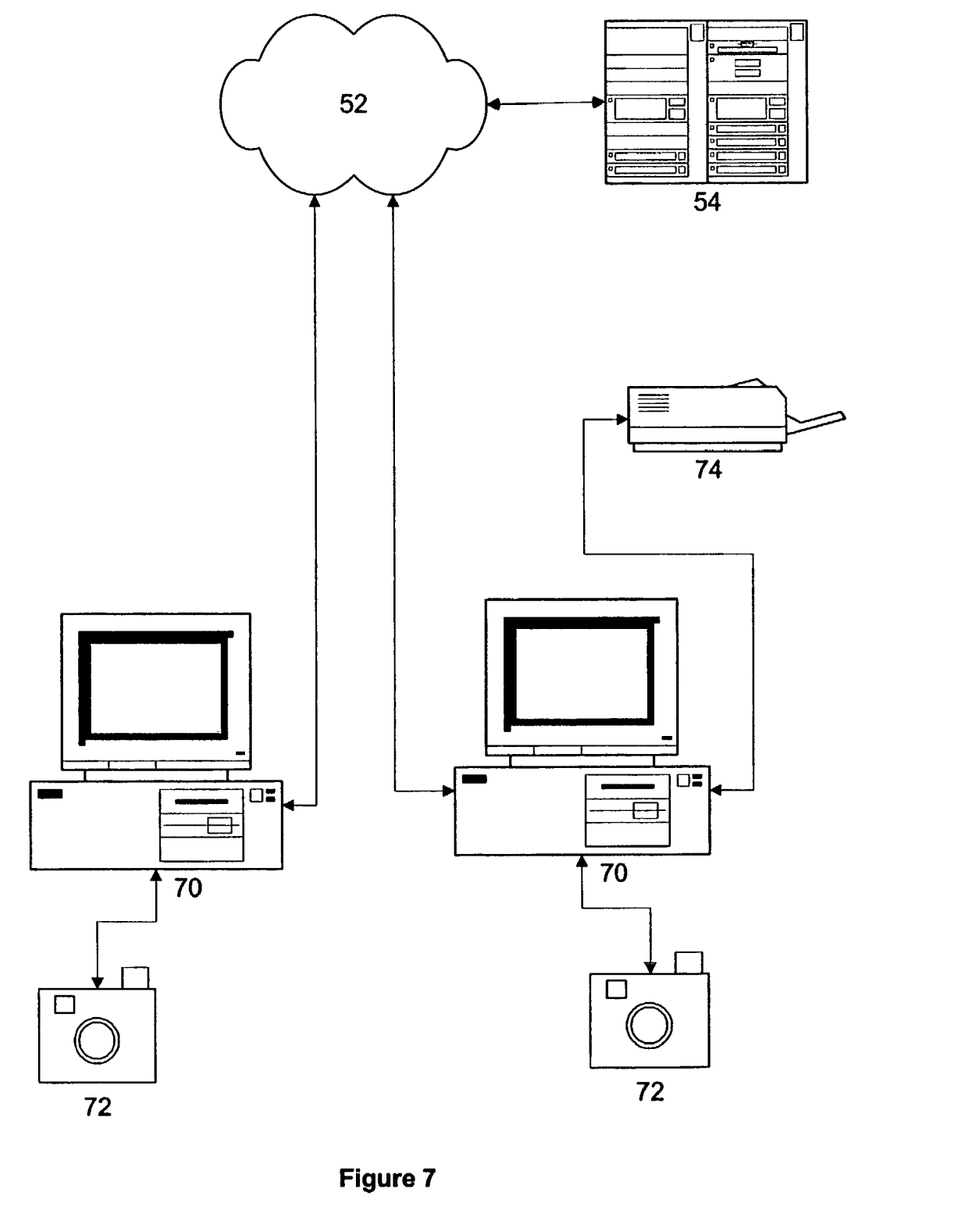
FIG. 7 illustrates means by which digital photographs may be transferred to the digital photograph repository.

The camera is designed to make use of any available opportunity to make the pictures that it currently holds available for sharing by the other users via the repository, using a digital communication connection to the digital camera. The repository is a medium through which the photographs taken by the users' synchronised cameras can be accessed and shared. The repository can take several possible forms. In a preferred embodiment of the invention (as illustrated in FIG. 5) the repository is provided by a fileserver, preferably being a remote webserver 54 provided by a third party on which the repository is hosted and the photographs are stored for access. The repository is connected to the Internet 52, which provides the great advantage that the network is pre-existing, is essentially global, and is not managed by any one entity. Data can be transferred to this webserver either directly from a digital camera 50 provided with suitable digital communication means (e.g. a built-in modem enabling the camera to be plugged directly into a telephone socket) or, as shown in FIG. 7, via a PC 70. In the latter case the pictures are first downloaded from the camera 72 onto the PC, and then from the PC to the webserver 54 via a modem connected to a telephone socket. A single web-based repository may be provided for global use, or local repositories may be provided for local use (e.g. one for the US, one for Europe, etc). Multiple repositories may be configured such that they give the outward appearance on the Internet of being a single one.

Figure 6:
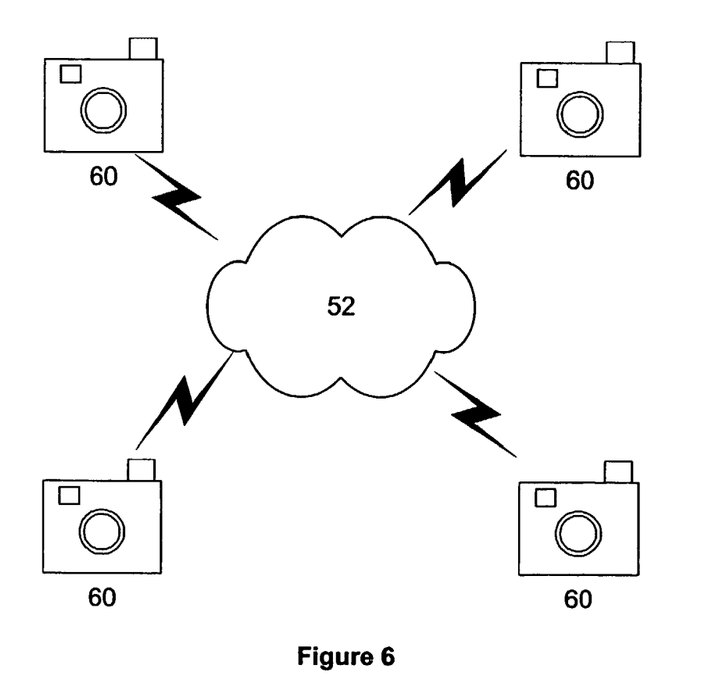
FIG. 6 illustrates the interconnection of cameras via a data communication network such that the cameras themselves act collectively as a digital photograph repository.

It will be appreciated that there are other means for establishing a repository using a digital communication network that would enable the sharing of the photographs and thereby satisfy the requirements of the present invention. For example, a local intranet network could be used. Another possibility, as illustrated in FIG. 6, is that the cameras themselves, and more specifically their storage media, could collectively form the fileserver and thereby enable the repository. In this latter case the cameras 60 must be interconnected, either by direct connection or via a pre-existing network such as the Internet 52. This can be facilitated by providing each camera with its own built-in modem, or a GSM or GPRS module. It is envisaged that each camera will only provide to the collective repository the pictures it itself took, although it is possible that each camera, on connection to form the collective repository, could avail itself of all the other photographs taken by the other cameras that have been made available for sharing.

Figure 8:
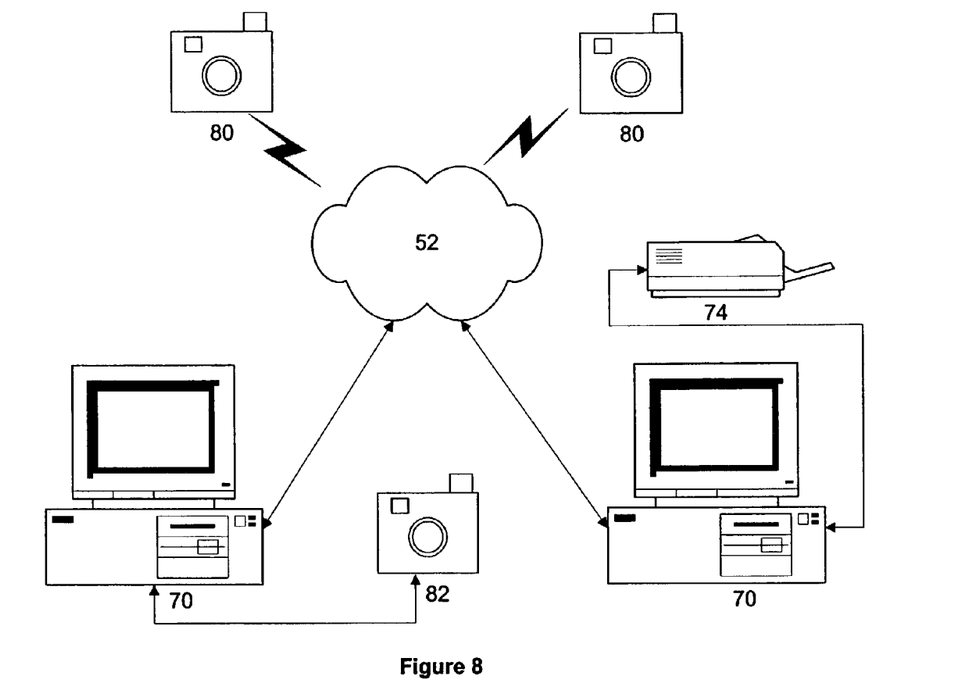
FIG. 8 illustrates the interconnection of PCs via a data communication network such that the PCs' storage media comprise the digital photograph repository.
Figure 9:
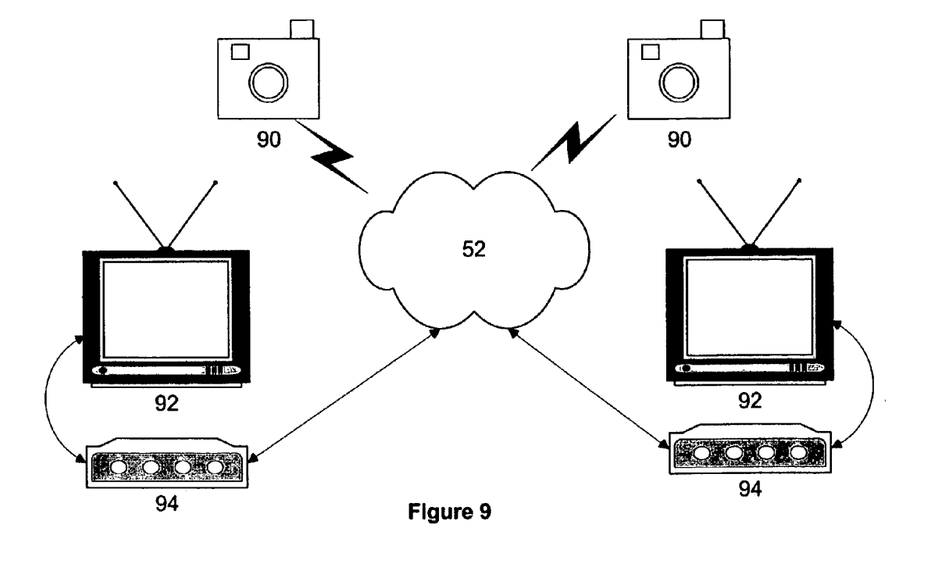
FIG. 9 illustrates the interconnection of data storage appliances via a data communication network such that their storage media comprise the digital photograph repository.

Alternatively, as shown in FIG. 8 the fileserver can comprise the data storage media of one or more PCs 70 connected to a data communication network such as the Internet 52, in an analogous fashion to the 'Napster' system for the sharing of music files. The photographs are first downloaded onto the PCs from the digital cameras 82, and then the photographs are made available for sharing. Yet a further alternative, as shown in FIG. 9, is that the fileserver comprises the data storage media of one or more data storage appliances 94 connected to a data communication network 52. Such appliances include tape devices, magneto-optic, CD-ROM, or flash memory devices, and others known to those skilled in the art. It is anticipated that relatively inexpensive data storage appliances could be used which comprise a storage medium such as a hard disk and a modem for connection to the Internet. The device 94 might also have a video output configured for connection to a domestic television set 92, thereby enabling users to access the repository from home, relatively cheaply.

On establishing a suitable data communication connection to the digital camera such that it is able to access the repository, the camera automatically identifies the repository using the address specified in the synchronisation code and enters (E4, FIG. 1) a download state (S4). Photographs that have not been designated as not to be shared (i.e. photographs the user has tacitly consented to be included in the repository) are then automatically made available to the repository, with no user intervention necessary.

In the preferred embodiment of the invention, in which the repository is hosted by a webserver, this stage involves the automatic transmission of the photographs to the repository via the Internet. After the photographs have been downloaded to the repository they are designated as having been downloaded and the camera returns (E5) to its picture-taking state (S2). In some instances the camera might not be connected to the data communication network for sufficient time to allow all the photographs to be downloaded, and consequently it is necessary to designate which photographs have already been downloaded so as not to repeat unnecessarily the process of downloading data for pictures which are already in the repository. It is important to emphasise that the photographs are transmitted automatically, without the user having to provide explicit instruction for this to occur. This thereby provides for a simple, straightforward and user-friendly system from which users can benefit.

Although the photographs intended for-sharing are to be automatically transmitted from the digital camera to the repository, this can only be accomplished when the user establishes a data communication connection to the camera. In the embodiment of the invention in which the cameras themselves constitute a collective repository, it is a requirement that all the relevant users connect their cameras to a common data communication network at effectively the same time. The connections need to be in place at the same time if all users are to be able to access each others' pictures.

Similar requirements for simultaneous co-operation between users exist in the embodiments in which the repository is made up of the storage devices of individuals' PCs or other data storage appliances. In these cases the storage devices in question must all be on-line at the same time to enable the users to access each others' pictures.

With respect to the preferred embodiment of the invention in which a webserver hosts the repository, there is no requirement for the users to connect their cameras at the same time. However, the users are obliged to ensure that they do remember to connect up at some point, so as to enable their pictures to be downloaded for access by others.

Although the onus is ultimately on the user to ensure that this occurs, digital cameras could be configured to remind the user of this obligation after a predetermined time, e.g. by displaying a message on the camera's built-in display or by emitting an audible signal.

Management of the Repository

Admittance to the repository, to access pictures taken at a specific common event, is preferably restricted by the repository, requiring the user to supply an user ID (which may be the Event ID) and password. Admittance is primarily intended for those whose cameras were synchronised at the event, who are given the user ID (or the Event ID) and password, but others may be admitted at the discretion of the photographers, if the photographers are willing to divulge the password. Such a password may be transmitted between the users during synchronisation of their cameras, for example, as part of the synchronisation code.

Since each picture in the repository identifies its photographer, it is possible for a number of repository management options to be set up, potentially specific to each event. For example, each photographer may be permitted to delete his own photographs from the repository. If one photographer (A) wishes another photographer (B) to remove one of his pictures (e.g. an embarrassing photograph of A taken by B) then since B can be identified he can be approached (e.g. by e-mail) by A and asked to remove the offending picture. Alternatively the repository can be managed by the person who originally initiated the synchronisation signal at the event, and only he can delete pictures. Alternatively the repository could be configured such that any user can delete any picture irrespective of its photographer.

Example Code Formats

To illustrate the concepts of the codes discussed above, some examples will now be given, in the context of synchronised digital cameras. It will be appreciated that many alternative forms of codes could be devised which would satisfy the requirements of the present invention.

Synchronisation Code

In a preferred embodiment of the invention, the Synchronisation Code (<Synchronisation_Code>) comprises the address of the repository to be used by each synchronised camera (<Repository_Address>), the Event ID (<Event_ID>), the Current Event Time (<Current_Event_Time>) in order to synchronise the clocks of the users' cameras, and also an Allocated Camera ID (<Allocated_Camera_ID>). That is to say, <Synchronisation_Code>::=
<Repository_Address><Event_ID><Current_Event_Time><Allocated_Camera_ID>

The Allocated Camera ID provides a means of distinguishing cameras present at the event. It is itself given by a concatenation of codes, as follows:

<Allocated_Camera_ID>::=<Own_Camera_ID><Synchronisation_Count>

<Camera_ID> is a unique identification code hard-coded into each camera, and <Synchronisation_Count> is a count of the number of cameras with which that specific camera has already synchronised.

The camera initiating the synchronisation event (e.g. camera 'A') has a Synchronisation Count of zero, and so its Allocated Camera ID is given by:

<Allocated_Camera ID>::=<Camera_ID><0>

By transmitting this information in the Synchronisation Code, the other cameras (e.g. cameras 'B', 'C' and 'D') are provided with the identity of the camera (i.e. 'A') responsible for initiating the synchronisation event. Accordingly, cameras 'B', 'C' and 'D' are now each synchronised with 3 other cameras. If one of these cameras (e.g. camera 'C') is itself required to transmit a Synchronisation Code to say two another cameras (e.g. 'E' and 'F') then camera C's own Synchronisation Count (i.e. 3) is transmitted along with the one it previously received (i.e. 0). Camera C's Allocated Camera ID, as transmitted in the Synchronisation Code it generates, is therefore given by:

<Allocated_Camera_ID>::=<Camera_ID><0><3>

By chaining the Synchronisation Counts in this manner the sequence in which cameras have become synchronised can be deduced.

The Repository Address and Event ID transmitted in these subsequent Synchronisation Codes will be as originally transmitted by Camera 'A', although the Current Event Time will be the time each subsequent camera transmits its Synchronisation Code.

When synchronising the internal clocks of cameras, instead of imposing the time of the first camera (Camera 'A') on the clocks of the others (e.g. 'B', 'C' and 'D'), the synchronisation process may simply supply cause cameras 'B', 'C' and 'D' to apply an offset to the their clocks, this offset being on a temporary basis in respect of this synchronised event.

The camera used to initiate a synchronisation event must be informed of the specific Repository Address to be used. In a preferred embodiment of the invention this camera must also be registered with the particular repository database. Accordingly, this camera may be subjected to a registration process in which the repository allocates a unique registration identifier (<Registration_ID>) to this camera. Such codes may be allocated by the repository in numerical sequence. Alternatively the camera could be pre-prepared (e.g. hard coded) with a registration identification code pertaining to an appropriate repository.

Through transmission of the Synchronisation Code, all the cameras which become synchronised are informed of the address of the repository to which they must all provide their photographs.

The Event ID (<Event_ID>) subsequently generated by this camera when initiating a synchronisation event is created using the above Registration ID combined with a event count (<Event_Count>), the latter being a count of the number of synchronisation events that this particular camera has initiated. That is to say, <Event_ID>::=<Registration_ID><Event_Count>

This ensures that each event has a Event ID which is unique to the repository used. This Event ID is passed to the other cameras during the synchronisation process, and will be associated with all the photographs taken by these users at this common event.

Picture Reference Code

Reference codes are advantageously added to the digital photographs prior to sending them to the repository. They are not essential for the invention to operate, but are desirable since they permit the repository to catalogue the photographs in a logical way.

A reference code (<Reference_Code>) may be defined by:
<Reference_Code>::=
<Camera_ID><Recording_Count><Time>

<Camera_ID> is the hard-coded camera identification code described above. <Recording_Count> is a sequential number assigned to each photograph taken, and <Time> is the time (and date) when the photograph was taken. The Event ID may also be included in the reference code.

Since <Camera_ID> is unique to each camera, the concatenation of <Camera_ID><Recording_Count> provides a code unique to each photograph, and this concatenation may therefore be used to uniquely identify any photograph—for storage and transfer purposes, for example. Indeed, on accessing photographs in the repository, users may export them as digital image files to another storage medium such as the hard disk of a PC 70 (FIG. 7), and/or print the photographs using a printer 74.

The repository can catalogue the pictures it receives from a common event in terms of the identity of the photographer (by means of the <Camera_ID> code), in chronological order (irrespective of the photographer) using the <Time> code, or by a combination of the two.

If the digital recordings with which the present invention is used are audio or video, then the reference code may be supplemented with information signifying the format of the recording, its duration, and details of the sample rate used. This information would be regarded by those skilled in the art as being standard header information for any recording, and therefore has not been included in the above discussion of reference codes.

Security Issues

Security is a relevant issue in connection with this invention, in terms of data transfer to and from the database, data storage in the database, and access rights to the database. Two forms of security are possible, both of which are independent and could be used with or without each other.

The first form of security ensures privacy of communication to and from the repository. This is achieved using a public key provided by the repository. Any communication to or from the repository would then be encrypted using this public key. The repository would have the private key in order to decrypt the communication. Accordingly, each camera to be used in conjunction with the repository would be required to have access to the public key provided by the repository. This key could be known to each camera in advance (e.g. by hard coding), or alternatively the camera initiating the synchronisation event would have the key and would distribute it to the other cameras during synchronisation—e.g. as part of the synchronisation code. In the latter case the repository could give the key to the initiating camera when it registered with the repository, or at any subsequent time when it communicated with the repository.

The second form of security denies the repository access to the recordings (e.g. photographs) it is holding for the group of cameras. This lack of rights may also apply to the reference code information associated with each picture. This could be achieved by using a public-private key encryption scheme. The initiating camera would provide a public key to encrypt the recordings (including the associated reference codes) that are sent to the repository. The repository would need to be informed that this protocol is being implemented, so as to avoid misinterpreting the data.

The associated private key used to decrypt the message could be distributed to appropriate cameras during synchronisation. This communication of the private key between cameras potentially offers opportunities for breach of security, and therefore this communication channel needs to be protected. Since the cameras to be synchronised are usually co-located, a mechanism of protecting this channel may be devised which involves some user intervention—for example, the cameras may provide a mechanism whereby people who are about to synchronise their cameras agree a password that could be used to protect the communication channel.

Figure 10:
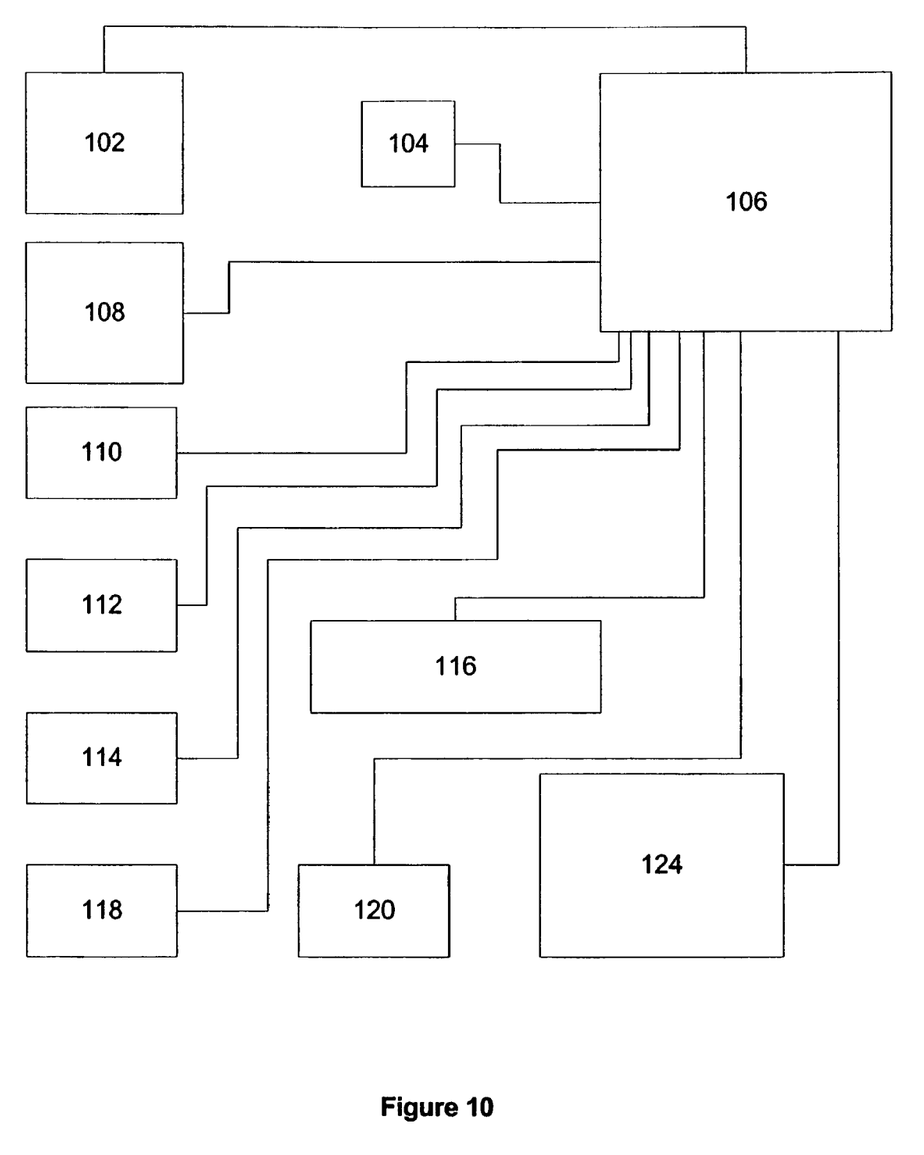
FIG. 10 illustrates the electronic architecture of a digital camera.

Camera Architecture (FIG. 10)

A digital camera made in accordance with the present invention comprises a central processing unit (CPU) 106 electrically connected to a charge coupled device (CCD) 102 in the camera lens which captures the photograph to be taken, and a liquid crystal display 108 on which photographs are presented for review by the user. Some built-in memory 116 connected to the CPU The camera is powered by a power supply 124. Also connected to the CPU 106 are a modem 110 having a socket into which a telephone cable may be plugged, and several other ports, as follows:

A smart media port 112 in which flash cards or memory sticks can be inserted and electrically coupled;

A serial cable connector 114 to enable the camera to be connected to a PC;

A wireless transmitter and receiver 118 enabling the camera to communicate using radio frequency (preferably Bluetooth (RTM)) transmission;

An infra-red transmitter and receiver 120.

It will be appreciated that a camera could function in accordance with the present invention having any one of, or any combination of, the digital communication means listed above. One alone would enable it to function satisfactorily, although, to facilitate digital communication, it is preferable to have more than one means of so doing. The invention is also intended to include data communication means not yet invented.

The camera also includes an audible alarm 104 which alerts the user, after a predetermined time, to remind him to connect the camera to the repository so as to enable his pictures to be downloaded for access by others. The liquid crystal display 108 may also be configured to display a visual message to remind the user of this obligation.

SUMMARY

This description of the preferred embodiment of the invention shows how the invention provides, inter alia, a digital recording device (e.g. a digital camera) having means of:

(i) Registering a user and obtaining an identification code (an Event ID) that is to be associated with a particular event. This may be done without needing to contact the database (e.g. a web-based repository), since when an event is declared the web-site may not be contactable.

(ii) Distributing the web address of the repository database website to every camera of the group.

(iii) Distributing a user id (which may be the Event ID) and password to everyone who is contributing pictures (or audio or video clips etc..)

(iv) Determining pictures to be transferred from the digital recording device to the repository—i.e. those taken by the camera after the registered user has been determined.

(v) Ensuring that the photographs are transferred to the repository by requiring that the cameras follow a protocol that causes them to contact the repository website when possible.

(vi) Organising the pictures taken at the common event into a common collection in the repository.

(vii) Associating supplementary organising data with the pictures. This at least enables different cameras to be distinguished, and also the time at which each picture was taken by them.

The invention claimed is:

1. A method of sharing a digital recording between a group of users of digital recording devices present at a common event, said method comprising:

(a) creating a digital recording using a digital recording device;

(b) subjecting the users' digital recording devices to a synchronisation event associated with the common event, the synchronisation event resulting in the transmission of a synchronisation code between the users' digital recording devices, the synchronisation code comprising an address code to uniquely identify a database, wherein the synchronisation code further comprises an event identification code, this event identification code being attributable to the digital recordings created by the digital recording devices at the common event, to signify that the digital recordings have been created at the common event;

(c) establishing a digital communication connection between the digital recording device which created the recording and the database;

(d) causing the database to receive the digital recording without input from a user; and (e) enabling a user to access the digital recording from the database.

2. A method as claimed in claim 1, wherein the synchronisation event comprises a first digital recording device transmitting a synchronisation signal in which the synchronisation code is transmitted to the other digital recording devices.

3. A method as claimed in claim 2, wherein the synchronisation signal is transmitted using an electrical link.

4. A method as claimed in claim 2, wherein the synchronisation signal is transmitted using a wireless link.

5. A method as claimed in claim 1, wherein the synchronisation event comprises the users manually entering a code via the user interfaces of their digital recording devices.

6. A method as claimed in claim 1, wherein the synchronisation code further comprises a code identifying the initiator of the synchronisation event.

7. A method as claimed in claim 1, wherein the synchronisation code further comprises a code specifying the current time.

8. A method as claimed in claim 1, wherein the synchronisation code further comprises an encryption code for use in encrypting and/or decrypting the digital recordings during transfer to and/or from the database.

9. A method as claimed in claim 1, further comprising a digital camera assigning a digital recording with a reference code.

10. A method as claimed in claim 9, wherein the reference code comprises information representative of the time at which the digital recording it accompanies was created, the database being able to interpret this information to organise chronologically the digital recordings taken at the common event.

11. A method as claimed in claim 9, wherein the reference code comprises the event identification code.

12. A method as claimed in claim 1, wherein the database comprises the collective data storage media of at least one digital recording device, the said at least one digital recording device having respective communication devices to enable them to function collectively as the database on establishing a digital communication connection between them.

13. A method as claimed in claim 1, wherein the database comprises the data storage media of at least one personal computer connected to a data communication network.

14. A method as claimed in claim 1, wherein the database comprises the data storage media of at least one data storage appliance connected to a data communication network.

15. A method as claimed in claim 1, further comprising providing a user with an opportunity to veto the inclusion in the said database of a digital recording he created.

16. A method as claimed in claim 1, wherein the digital recording devices are digital cameras and the digital recordings are digital photographs.

17. A method of sharing a digital recording between a group of users of digital recording devices present at a common event, said method comprising:
(a) creating a digital recording using a digital recording device;
(b) subjecting the users' digital recording devices to a synchronisation event associated with the common event, the synchronisation event resulting in the transmission of a synchronisation code between the users' digital recording devices, the synchronisation code comprising an address code to uniquely identify a database;
(c) establishing a digital communication connection between the digital recording device which created the recording and the database;
(d) causing the database to receive the digital recording without input from a user; and
(e) enabling a user to access the digital recording from the database,
wherein the synchronisation code further comprises a password, the password being for use by the database to restrict access to the digital recordings created at the common event.

18. A method of sharing a digital recording between a group of users of digital recording devices present at a common event, said method comprising:
(a) creating a digital recording using a digital recording device;
(b) subjecting the users' digital recording devices to a synchronisation event associated with the common event, the synchronisation event resulting in the transmission of a synchronisation code between the users' digital recording devices, the synchronisation code comprising an address code to uniquely identify a database;
(c) establishing a digital communication connection between the digital recording device which created the recording and the database;
(d) causing the database to receive the digital recording without input from a user;
(e) enabling a user to access the digital recording from the database; and
assigning a digital recording with a reference code via a digital camera,
wherein the reference code comprises an identification code specific to the digital recording device on which it was created, the database being able to interpret this code to indicate the identity of the creator of each of the digital recordings taken at the common event.

19. A method of sharing a digital recording between a group of users of digital recording devices present at a common event, said method comprising:
(a) creating a digital recording using a digital recording device;
(b) subjecting the users' digital recording devices to a synchronisation event associated with the common event, the synchronisation event resulting in the transmission of a synchronisation code between the users' digital recording devices, the synchronisation code comprising an address code to uniquely identify a database;
(c) establishing a digital communication connection between the digital recording device which created the recording and the database;
(d) causing the database to receive the digital recording without input from a user; and
(e) enabling a user to access the digital recording from the database,
wherein the database comprises the collective data storage media of at least one digital recording device, the said at least one digital recording device having respective communication devices to enable them to function collectively as the database on establishing a digital communication connection between them.
wherein the communication devices are selected from a group comprising: modems and GSM transceivers and GPRS transceivers.

20. A digital recording device for creating digital recordings, the digital recording device being communicatively connectable to a data communication network, the said digital recording device being operable to receive a synchronisation code and hence to become synchronised with other such digital recording devices, the synchronisation code comprising the address of a database, wherein the synchronisation code further comprises an event identification code, this event identification code being attributable to the digital recordings created by the digital recording devices at the common event, to signify that the digital recordings have been created at a common event, where users of the digital recording devices are present at the common event, the digital recording device being configured to make digital recordings available to the database at the said address without input from a user on the establishment of a data communication connection between the digital recording device and the data communication network.

21. A digital recording device as claimed in claim 20, further comprising means for transmitting and receiving signals to and from other such digital recording devices.

22. A digital recording device as claimed in claim 21, wherein the means for transmitting and receiving signals comprise a port into which a cable can be inserted and electrically coupled.

23. A digital recording device as claimed in claim 21, wherein the means for transmitting and receiving signals comprise a wireless transmitter and receiver.

24. A digital recording device as claimed in claim 20, operable to generate and receive coded information by which an event can be identified.

25. A digital recording device as claimed in claim 20 having data storage media which can serve as part of the said database on connection of the digital recording device to a data communication network.

26. A digital recording device as claimed in claim 20, being a digital camera.

* * * * *